US012789639B2

(12) United States Patent
Lian et al.

(10) Patent No.: US 12,789,639 B2
(45) Date of Patent: Nov. 10, 2026

(54) ENERGY CONVERSION DEVICE AND VEHICLE

(71) Applicant: BYD COMPANY LIMITED, Shenzhen (CN)

(72) Inventors: Yubo Lian, Shenzhen (CN); Heping Ling, Shenzhen (CN); Hua Pan, Shenzhen (CN); Jicheng Li, Shenzhen (CN); Yuxin Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/190,915

(22) Filed: Apr. 28, 2025

(65) Prior Publication Data

US 2025/0249754 A1 Aug. 7, 2025

Related U.S. Application Data

(63) Continuation of application No. PCT/CN2023/126893, filed on Oct. 26, 2023.

(30) Foreign Application Priority Data

Oct. 31, 2022 (CN) ......................... 202211352512.5

(51) Int. Cl.
*B60L 15/02* (2006.01)
*B60L 15/06* (2006.01)
(Continued)

(52) U.S. Cl.
CPC ............. *B60L 15/025* (2013.01); *B60L 15/06* (2013.01); *B60L 15/20* (2013.01); *B60L 53/11* (2019.02);
(Continued)

(58) Field of Classification Search
None
See application file for complete search history.

(56) References Cited

U.S. PATENT DOCUMENTS

| | | | | |
|---|---|---|---|---|
| 11,482,954 | B2 * | 10/2022 | Hao .................. | H01M 10/6571 |
| 2016/0028340 | A1 | 1/2016 | Nakai et al. | |
| 2022/0149753 | A1 | 5/2022 | Saha et al. | |

FOREIGN PATENT DOCUMENTS

| | | |
|---|---|---|
| CN | 111347837 A | 6/2020 |
| CN | 111347886 A | 6/2020 |

(Continued)

OTHER PUBLICATIONS

The World Intellectual Property Organization (WIPO) International Search Report for PCT/CN2023/126893 Jan. 20, 2024 8 Pages (including translation).

*Primary Examiner* — Todd Melton
(74) *Attorney, Agent, or Firm* — Wenye Tan

(57) ABSTRACT

An energy conversion device comprises: an electric motor, an electronic control, a traction battery and a controller. The controller is configured to control all bridge arms corresponding to windings of the electric motor, so that the collaboration of driving and battery self-heating is achieved, and the crest and trough of an actual N line current flowing through an N line of the electric motor to counteract or are superposed with the crest and trough of an actual phase current flowing through each phase of winding of the electric motor, thus reducing or increasing the amplitudes of the actual phase current of each phase of winding at the crest and trough, and thereby providing a greater phase current for the electric motor so as to drive the electric motor. Thus, the torque output by the electric motor is greater.

20 Claims, 9 Drawing Sheets

(51) Int. Cl.

| | |
|---|---|
| ***B60L 15/20*** | (2006.01) |
| ***B60L 53/10*** | (2019.01) |
| ***B60L 53/24*** | (2019.01) |
| ***H02M 1/44*** | (2007.01) |
| ***H02M 7/5387*** | (2007.01) |

(52) U.S. Cl.

CPC ............... *B60L 53/24* (2019.02); *H02M 1/44* (2013.01); *H02M 7/53871* (2013.01); *B60L 2210/14* (2013.01); *B60L 2210/40* (2013.01); *B60L 2240/423* (2013.01); *B60L 2240/429* (2013.01); *B60L 2240/527* (2013.01); *B60L 2240/545* (2013.01); *B60L 2250/28* (2013.01)

(56) References Cited

FOREIGN PATENT DOCUMENTS

| | | | |
|---|---|---|---|
| CN | 113183826 | A | 7/2021 |
| CN | 113752908 | A | 12/2021 |
| CN | 113752914 | A | 12/2021 |
| CN | 113858966 | A | 12/2021 |
| CN | 114096435 | A | 2/2022 |
| CN | 115139854 | A | 10/2022 |
| CN | 113948797 | B | 1/2024 |
| JP | 2021093845 | A | 6/2021 |
| WO | 2021036794 | | 3/2021 |
| WO | 2022160828 | | 8/2022 |

* cited by examiner

ENERGY CONVERSION DEVICE AND VEHICLE

CROSS-REFERENCE TO RELATED APPLICATIONS

The present application is a continuation application of PCT application No. PCT/CN2023/126893, filed on Oct. 26, 2023, which claims priority to Chinese Patent Application No. 202211352512.5, filed on Oct. 31, 2022 and entitled "ENERGY CONVERSION DEVICE AND VEHICLE", content of all of which is incorporated herein by reference in its entirety.

FIELD

The present disclosure relates to the field of battery management technologies, and in particular, to an energy conversion device and a vehicle.

BACKGROUND

The related art proposes that a power battery is used for self-heating. However, the related art does not involve researches on cooperative control of self-heating of a power battery and motor driving. Therefore, in a self-heating process of a battery, power performance of a whole vehicle cannot be selectively improved or a heat output of an electric drive system cannot be selectively increased.

SUMMARY

To solve certain problems in the related art, the present disclosure provides an energy conversion device and a vehicle.

To achieve the above objective, an embodiment of the present disclosure provides an energy conversion device, including:

a motor, the motor including at least two windings, and first ends of the at least two windings being connected together and leading out an N line;

an electronic control, the electronic control including at least two bridge arms, first ends of the at least two bridge arms being connected together to form a first bus terminal, second ends of the at least two bridge arms being connected together to form a second bus terminal, and a midpoint of each bridge arm being connected to a second end of the corresponding winding;

a power battery, the power battery including a first battery pack and a second battery pack connected in series to the first battery pack, a positive terminal of the first battery pack being connected to the first bus terminal, a negative terminal of the second battery pack being connected to the second bus terminal, and a midpoint of the first battery pack and a midpoint of the second battery pack being connected to the N line; and a controller, the controller being connected to the electronic control, and the controller being configured to:

when a vehicle condition satisfies a first condition, control each of the bridge arms corresponding to the windings of the motor, to achieve cooperation between driving and battery self-heating, and control each of the bridge arms corresponding to the windings of the motor, to cause a crest and trough of an actual N line current flowing through the N line to counteract a crest and trough of an actual phase current flowing through each winding; and when the vehicle condition satisfies a second condition, control each of the bridge arms corresponding to the windings of the motor, to achieve cooperation between driving and battery self-heating, and control each of the bridge arms corresponding to the windings of the motor, to cause a crest and trough of an actual N line current flowing through the N line to be superposed with a crest and trough of an actual phase current flowing through each winding, where the first condition and the second condition are different.

An embodiment of the present disclosure further provides a vehicle, including the above energy conversion device.

According to the technical solutions provided in the present disclosure, when the vehicle condition satisfies the first condition, the controller controls the cooperation between driving and battery self-heating, and controls the crest and trough of the actual N line current flowing through the N line to counteract the crest and trough of the actual phase current flowing through each winding, so that the amplitudes of the actual phase current of each winding at the crest and trough decrease, thereby improving the utilization rate of the actual phase current. Thus: a higher phase current is provided for the motor, to drive the motor, so that the motor outputs a larger torque, thereby improving the dynamic performance of a whole vehicle. A higher speed range can be achieved at the same bus voltage, thereby improving the dynamic performance of the whole vehicle. An EMC interference is reduced, so that it is not easy to trigger overcurrent protection, thereby avoiding frequent overcurrent protection of the whole vehicle. A self-heating current of the N line automatically changes a carrier frequency, and optimizes Noise Vibration Harshness (NHV) and Electro Magnetic Compatibility (EMC).

When the vehicle condition satisfies the second condition, the controller controls the cooperation between driving and battery self-heating, and controls the crest and trough of the actual N line current flowing through the N line to be superposed with the crest and trough of the actual phase current flowing through each winding, so that the amplitudes of the actual phase current of each winding at the crest and trough increase. Therefore, the heat output of the electric drive system can be increased. The heat generated by the electric drive system can be used by a passenger compartment, so that the passenger compartment is rapidly heated. Alternatively, the heat generated by the electric drive system can heat cooling liquid through a heat pump system, and then the heated cooling liquid heats the power battery. The power battery can be heated more rapidly in combination with the actual N line current. Therefore, the energy conversion device provided by the present disclosure can selectively improve the dynamic performance of the whole vehicle or increase the heat output of the electric drive system in the battery self-heating process.

In addition, when the vehicle condition satisfies the first condition or when the vehicle condition satisfies the second condition, the energy conversion device provided by the present disclosure can make the phase current of the alternating current motor more symmetrical, without low and high waveforms, and the alternating current motor and electronic control are used more uniformly, thereby avoiding excessive use of a winding and a bridge arm group.

Other features and advantages of the present disclosure will be described in detail in the following detailed description part.

BRIEF DESCRIPTION OF THE DRAWINGS

The accompanying drawings are intended to provide further understanding of the present disclosure and constitute a part of this specification. The accompanying drawings and the specific implementations below are used together for explaining the present disclosure rather than constituting a limitation to the present disclosure. In the accompanying drawings.

DETAILED DESCRIPTION

Specific implementations of the present disclosure are described in detail below with reference to the accompanying drawings. It should be understood that the specific implementations described herein are merely used to describe and explain the present disclosure, but are not intended to limit the present disclosure.

It should be noted that, in the present disclosure, all actions of obtaining a signal, information, or data are performed on the premise of complying with a data protection regulation policy corresponding to a country in which the data protection regulation policy is and obtaining an authorization given by an owner of a corresponding device.

With the development and rapid popularization of electric vehicles, lithium-ion power batteries have been widely used. Due to the inherent characteristics of the batteries, charging and discharging the batteries at appropriate temperatures can improve the charging and discharging efficiency, prolong the service lives of the batteries, and significantly reduce the charging and discharging capabilities of the batteries at low temperatures, which will affect the use of the electric vehicles in cold areas.

The related art proposes that a power battery is used for self-heating. However, the related art does not involve researches on cooperative control of self-heating of a power battery and motor driving. Therefore, in a self-heating process of a battery, power performance of a whole vehicle cannot be selectively improved or a heat output of an electric drive system cannot be selectively increased.

Figure 1:
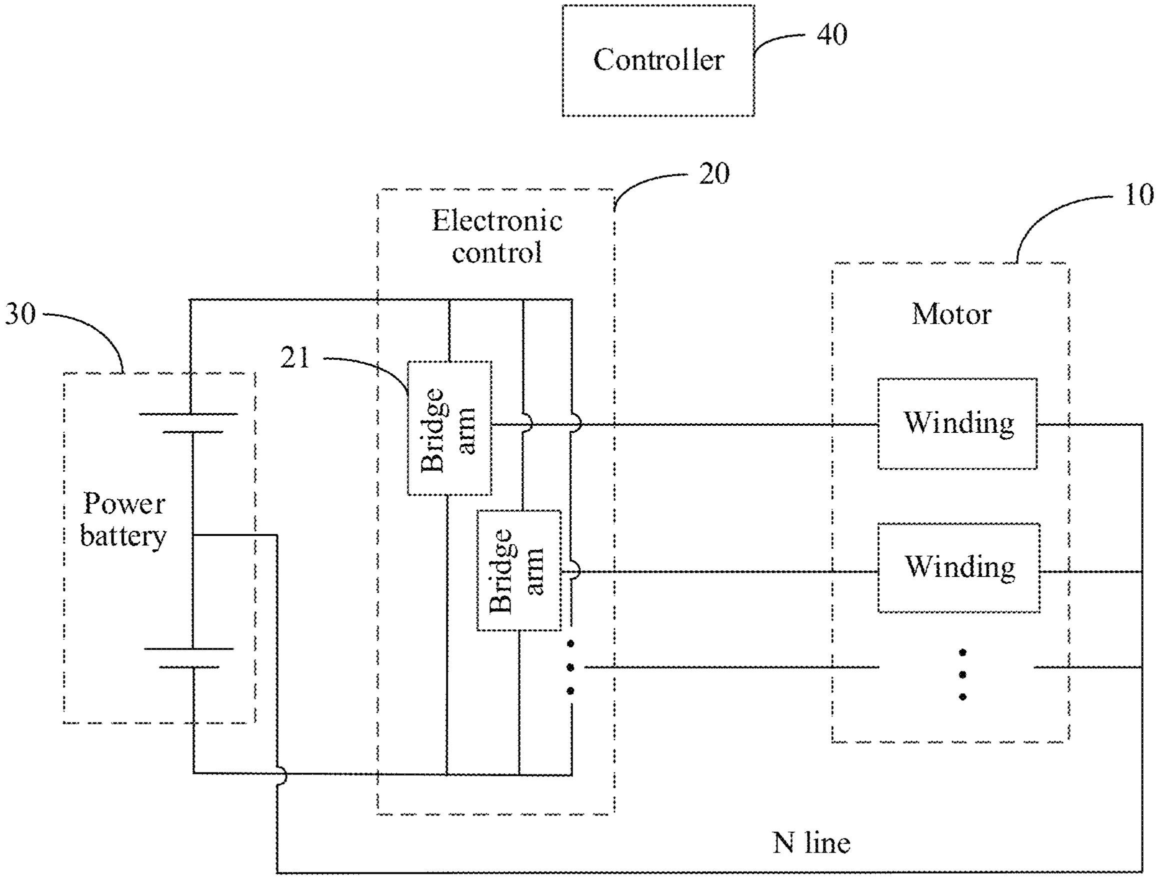
FIG. 1 is a block diagram of an energy conversion device according to an embodiment of the present disclosure.

An embodiment of the present disclosure provides an energy conversion device. FIG. 1 is a block diagram of an energy conversion device according to an embodiment of the present disclosure. As shown in FIG. 1, the energy conversion device includes:

a motor 10, the motor 10 including at least two windings, and first ends of the at least two windings being connected together and leading out an N line;

an electronic control 20, the electronic control 20 including at least two bridge arms 21, first ends of the at least two bridge arms 21 being connected together to form a first bus terminal, second ends of the at least two bridge arms 21 being connected together to form a second bus terminal, and a midpoint of each bridge arm 21 being connected to a second end of the corresponding winding;

a power battery 30, the power battery 30 including a first battery pack and a second battery pack connected in series to the first battery pack, a positive terminal of the first battery pack being connected to the first bus terminal, a negative terminal of the second battery pack being connected to the second bus terminal, and a midpoint of the first battery pack and a midpoint of the second battery pack being connected to the N line; and a controller 40, the controller 40 being connected to the electronic control 20, and the controller 40 being configured to:

when a vehicle condition satisfies a first condition, control each of the bridge arms 21 corresponding to the windings of the motor 10, to achieve cooperation between driving and battery self-heating, and control each of the bridge arms 21 corresponding to the windings of the motor 10, to cause a crest and trough of an actual N line current flowing through the N line to counteract a crest and trough of an actual phase current flowing through each winding; and when the vehicle condition satisfies a second condition, control each of the bridge arms 21 corresponding to the windings of the motor 10, to achieve cooperation between driving and battery self-heating, and control each of the bridge arms 21 corresponding to the windings of the motor 10, to cause a crest and trough of an actual N line current flowing through the N line to be superposed with a crest and trough of an actual phase current flowing through each winding. The first condition is different from the second condition.

The connection between the controller 40 and the electronic control 20 may be a wired connection or a wireless connection. In the present disclosure, a mode in which the controller 40 is wirelessly connected to the electronic control 20 is only exemplarily shown.

Figure 2:
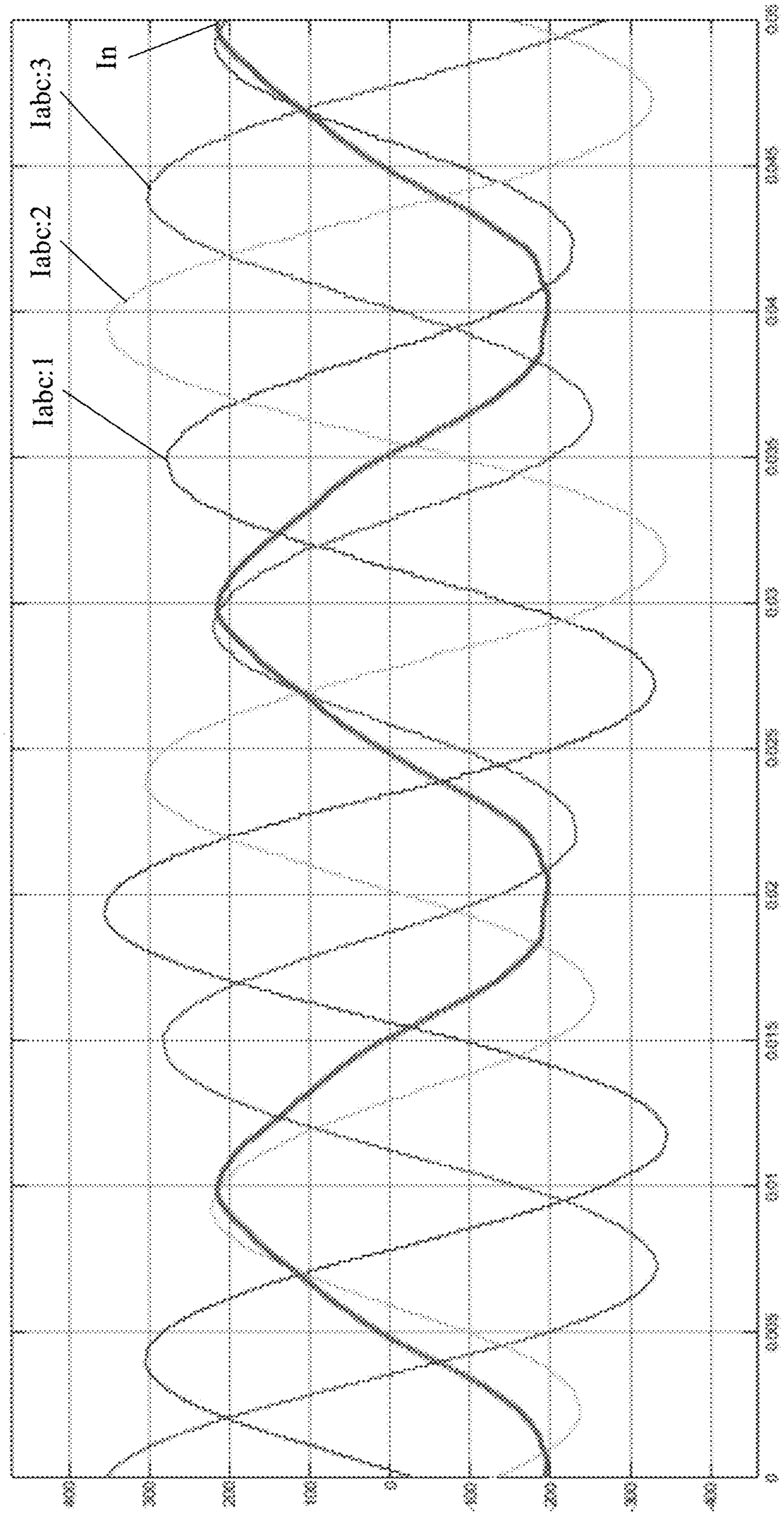
FIG. 2 is a waveform diagram of an actual phase current and an actual N line current of a three-phase alternating current motor with a motor speed of 1000 rpms, an amplitude of an actual N line current of 200 A, and a frequency of an actual N line current of 50 Hz.
Figure 3:
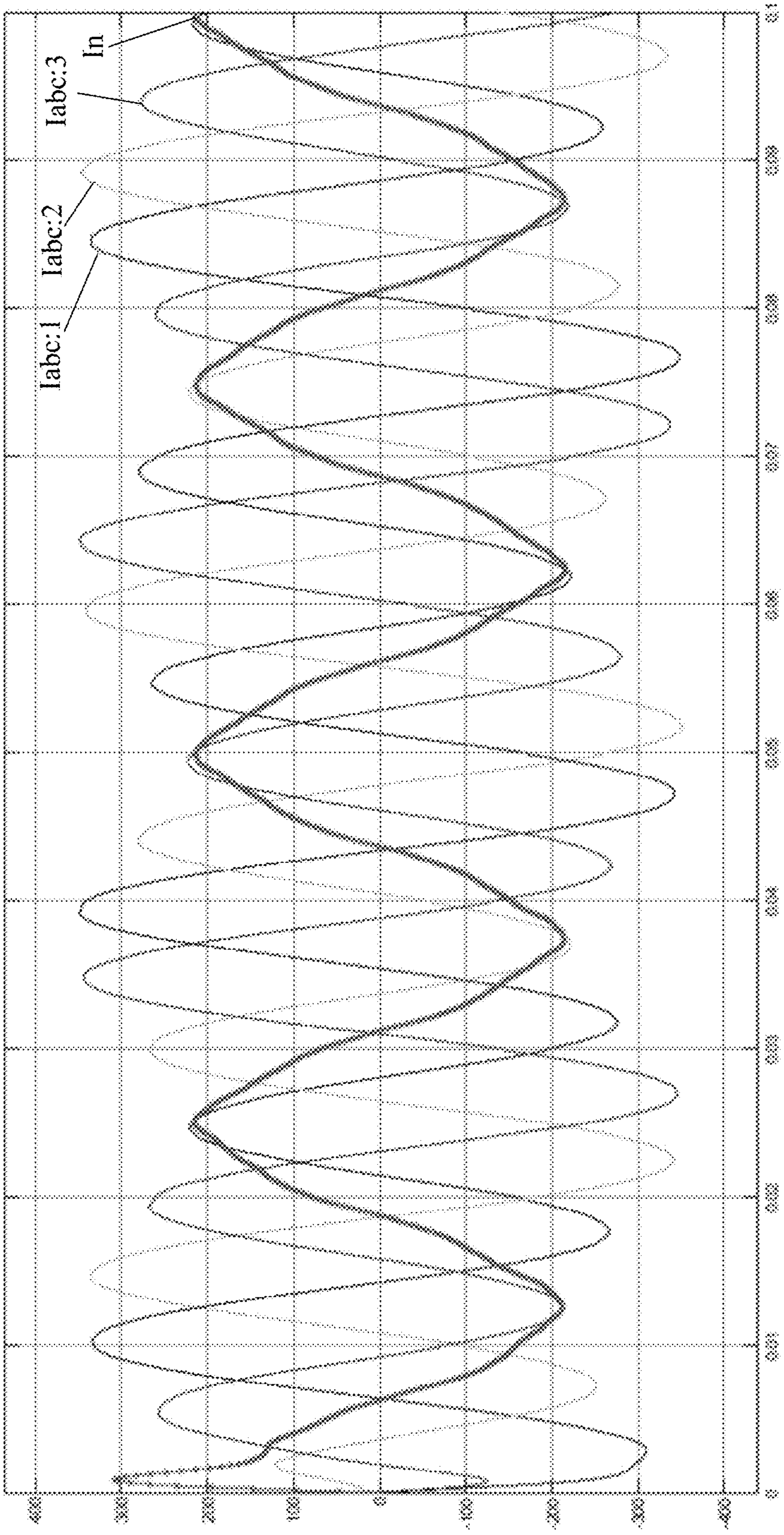
FIG. 3 is a waveform diagram of an actual phase current and an actual N line current of a three-phase alternating current motor with a motor speed of 1000 rpms, an amplitude of an actual N line current of 200 A, and a frequency of an actual N line current of 40 Hz.
Figure 4:
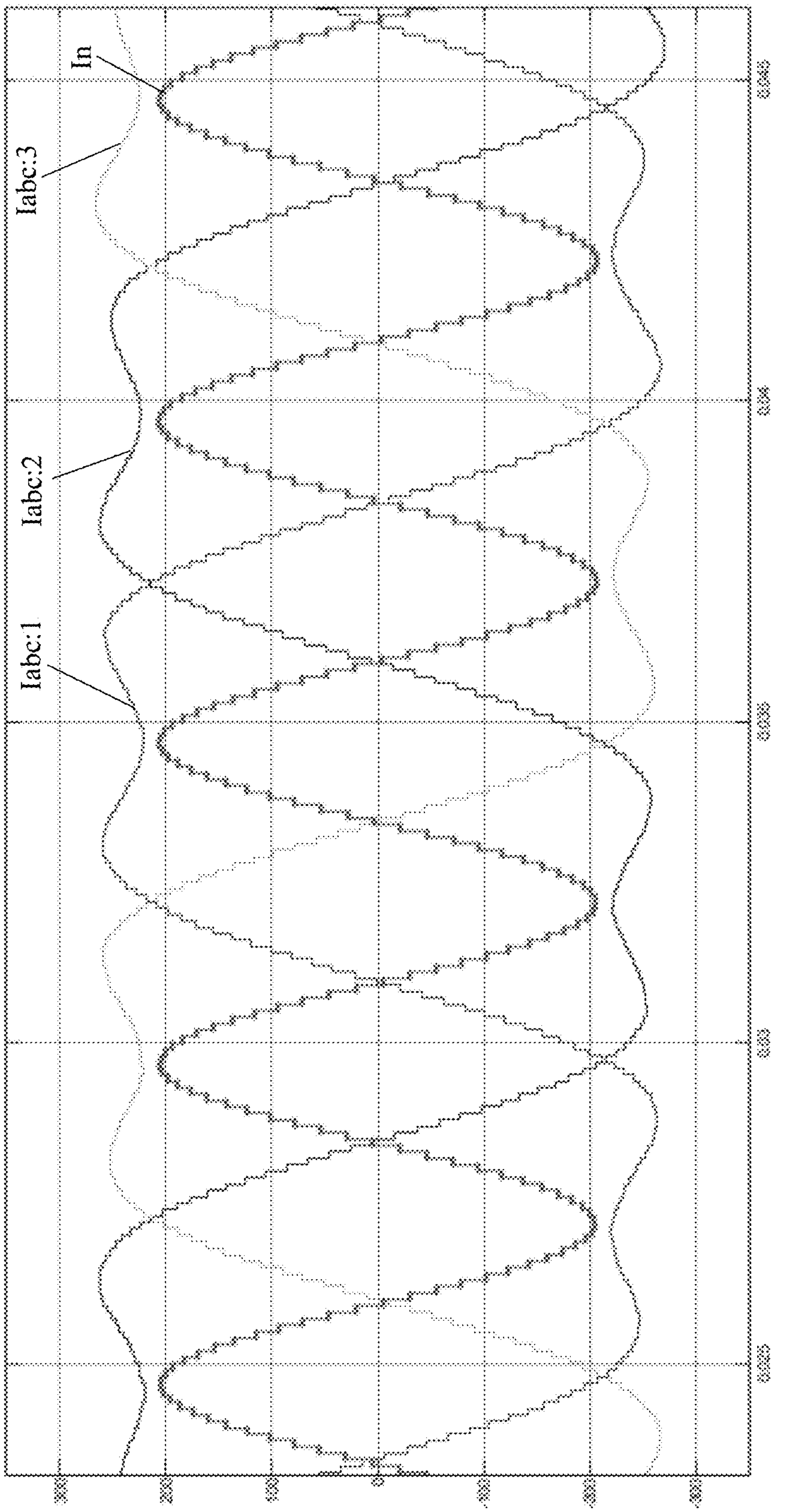
FIG. 4 is a waveform diagram of an actual phase current and an actual N line current of an energy conversion device according to the present disclosure when a vehicle condition satisfies a first condition, a motor speed being 1000 rpms and an amplitude of the actual N line current being 200 A.
Figure 5:
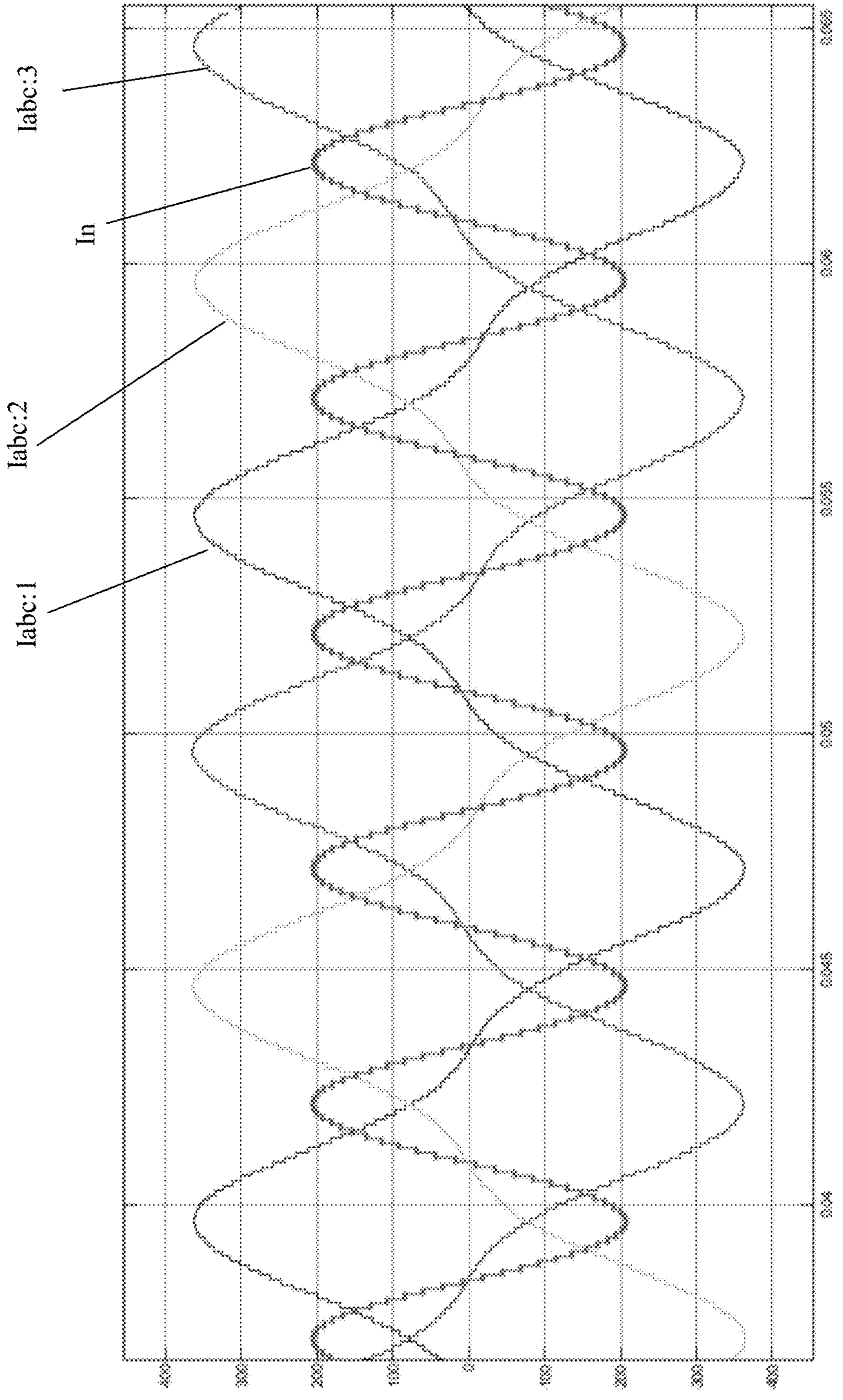
FIG. 5 is a waveform diagram of an actual phase current and an actual N line current of an energy conversion device according to the present disclosure when a vehicle condition satisfies a second condition, a motor speed being 1000 rpms and an amplitude of the actual N line current being 200 A.

FIG. 2 is a waveform diagram of an actual phase current and an actual N line current of a three-phase alternating current motor with a motor speed of 1000 rpms, an amplitude of an actual N line current of 200 A, and a frequency of an actual N line current of 50 Hz. FIG. 3 is a waveform diagram of an actual phase current and an actual N line current of a three-phase alternating current motor with a motor speed of 1000 rpms, an amplitude of an actual N line current of 200 A, and a frequency of an actual N line current of 40 Hz. FIG. 4 is a waveform diagram of an actual phase current and an actual N line current of an energy conversion device according to the present disclosure when a vehicle condition satisfies a first condition, a motor speed being 1000 rpms and an amplitude of the actual N line current being 200 A. FIG. 5 is a waveform diagram of an actual phase current and an actual N line current of an energy conversion device according to the present disclosure when a vehicle condition satisfies a second condition, a motor speed being 1000 rpms and an amplitude of the actual N line current being 200 A. In FIG. 2 to FIG. 5, Iabc: 1, Iabc: 2, and Iabc: 3 respectively indicate three actual phase currents of a three-phase alternating current motor. In indicates an actual N line current of the alternating current motor. FIG. 2 and FIG. 3 are waveform diagrams obtained without using the energy conversion device provided by the present disclosure, that is, the controller in FIG. 2 and FIG. 3 is not configured to: control each of the bridge arms corresponding to the windings of the motor, to achieve cooperation between driving and battery self-heating, and control each of the bridge arms corresponding to the windings of the motor, to cause a crest and trough of an actual N line current flowing through the N line to counteract or be superposed with a crest and trough of an actual phase current flowing through each winding. When the vehicle condition satisfies the first condition, it may be learned by comparing the waveform diagrams in FIG. 2 and FIG. 3 with the waveform diagram in FIG. 4 that: In a case that an amplitude of a self-heating current of the N line keeps unchanged and a torque of the motor keeps unchanged, for example, in FIG. 2 to FIG. 3, the amplitude of the actual N line current is 200 A, and the motor speed is 1000 pm. The amplitude of the actual phase current of the alternating current motor in use of the energy conversion device provided by the present disclosure is smaller than the amplitude in no use of the energy conversion device provided by the present disclosure. For example, in FIG. 4, the amplitudes of Iabc: 1, Iabc: 2, and Iabc: 3 are about 260 A, and in FIG. 2 and FIG. 3, the amplitudes of two of Iabc: 1, Iabc: 2, and Iabc: 3 exceed 300 A. When the energy conversion device provided by the present disclosure is not used, the amplitudes of the three actual phase currents of the alternating current motor are different and have obvious low and high waveforms. For example, in FIG. 2 and FIG. 3, the amplitudes of Iabc: 1, Iabc: 2, and Iabc: 3 are different, two of which exceed 300 A and the other one of which does not reach 300 A. However, when the energy conversion device provided by the present disclosure is used, the three actual phase currents of the alternating current motor are more symmetrical, without low and high waveforms. For example, in FIG. 4, the amplitudes of Iabc: 1, Iabc: 2, and Iabc: 3 are the same and are about 260 A. When the vehicle condition satisfies the second condition, it may be learned by comparing the waveform diagrams in FIG. 2 and FIG. 3 with the waveform diagram in FIG. 5 that: In a case that an amplitude of a self-heating current of the N line keeps unchanged and a torque of the motor keeps unchanged, for example, in FIG. 2 to FIG. 3, the amplitude of the actual N line current is 200 A, and the motor speed is 1000 pm. The amplitude of the actual phase current of the alternating current motor in use of the energy conversion device provided by the present disclosure is larger than the amplitude in no use of the energy conversion device provided by the present disclosure. For example, in FIG. 5, the amplitudes of Iabc: 1, Iabc: 2, and Iabc: 3 are about 360 A. In FIG. 2 and FIG. 3, the amplitudes of two of Iabc: 1, Iabc: 2, and Iabc: 3 are 320 A, and the other amplitude does not reach 300 A. When the energy conversion device provided by the present disclosure is not used, the amplitudes of the three actual phase currents of the alternating current motor are different and have obvious low and high waveforms. For example, in FIG. 2 and FIG. 3, the amplitudes of Iabc: 1, Iabc: 2, and Iabc: 3 are different, two of which are 320 A and the other one of which does not reach 300 A. However, when the energy conversion device provided by the present disclosure is used, the three actual phase currents of the alternating current motor are more symmetrical, without low and high waveforms. For example, in FIG. 5, the amplitudes of Iabc: 1, Iabc: 2, and Iabc: 3 are the same and are about 360 A.

According to the technical solutions, when the vehicle condition satisfies the first condition, the controller controls the cooperation between driving and battery self-heating, and controls the crest and trough of the actual N line current flowing through the N line to counteract the crest and trough of the actual phase current flowing through each winding, so that the amplitudes of the actual phase current of each winding at the crest and trough decrease, thereby improving the utilization rate of the actual phase current. Thus: a higher phase current is provided for the motor, to drive the motor, so that the motor outputs a larger torque, thereby improving the dynamic performance of a whole vehicle. A higher speed range can be achieved at the same bus voltage, thereby improving the dynamic performance of the whole vehicle. An EMC interference is reduced, so that it is not easy to trigger overcurrent protection, thereby avoiding frequent overcurrent protection of the whole vehicle. A self-heating current of the N line automatically changes a carrier frequency, and optimizes Noise Vibration Harshness (NHV) and Electro Magnetic Compatibility (EMC).

When the vehicle condition satisfies the second condition, the controller controls the cooperation between driving and battery self-heating, and controls the crest and trough of the actual N line current flowing through the N line to be superposed with the crest and trough of the actual phase current flowing through each winding, so that the amplitudes of the actual phase current of each winding at the crest and trough increase. Therefore, the heat output of the electric drive system can be increased. The heat generated by the electric drive system can be used by a passenger compartment, so that the passenger compartment is rapidly heated. Alternatively, the heat generated by the electric drive system can heat cooling liquid through a heat pump system, and then the heated cooling liquid heats the power battery. The power battery can be heated more rapidly in combination with the actual N line current. Therefore, the energy conversion device provided by the present disclosure can selectively improve the dynamic performance of the whole vehicle or increase the heat output of the electric drive system in the battery self-heating process. In addition, when the vehicle condition satisfies the first condition or when the vehicle condition satisfies the second condition, the energy conversion device provided by the present disclosure can make the phase current of the alternating current motor more symmetrical, without low and high waveforms, and the alternating current motor and electronic control are used more uniformly, thereby avoiding excessive use of a winding and a bridge arm group.

It can be learned from the above analysis that the crest and trough of the actual N line current flowing through the N line is caused to counteract the crest and trough of the actual phase current flowing through each winding, thus improving the dynamic performance of the vehicle. Therefore, the first condition may be set to be a condition intending to improve or needing to improve the dynamic performance of the vehicle. Therefore, optionally, the first condition includes: an obtained depth of an accelerator pedal is greater than a preset depth, or an obtained remaining battery level of the power battery is less than a preset battery level.

When the obtained depth of the accelerator pedal is greater than the preset depth, it may indicate that the vehicle is in a running mode having a high demand for the dynamic performance of the whole vehicle. When the obtained remaining battery level of the power battery is less than the preset battery level, it may indicate that the remaining battery level of the power battery is small, so that consumption needs to be reduced to save the electric energy and improve the efficiency of the electric drive system, and a self-heating energy-saving mode needs to be implemented. The remaining battery level may be indicated by using a state of charge (SOC).

It can be learned from the above analysis that the crest and trough of the actual N line current flowing through the N line is caused to be superposed with the crest and trough of the actual phase current flowing through each winding, which can increase the heat output of the electric drive system. Therefore, the second condition can be set to be a condition intending or needing to increase the heat output of the electric drive system. Optionally, the second condition includes: a received temperature corresponding to a passenger compartment warmup demand is greater than a current passenger compartment temperature, or an obtained temperature corresponding to a warmup demand of the power battery is greater than a current temperature of the power battery.

When the received temperature corresponding to the passenger compartment warmup demand is greater than the current passenger compartment temperature, it may indicate that the passenger compartment temperature needs to be increased. Therefore, it is intended or needs to increase the heat output of the electric drive system. When the obtained temperature corresponding to the warmup demand of the power battery is greater than the current temperature of the power battery, it may indicate that the power battery needs to be heated. Therefore, it is intended or needs to increase the heat output of the electric drive system.

Optionally, the controller is further configured to:

obtain a differential mode voltage of each bridge arm, the differential mode voltage being configured to represent a demand for an output torque of the motor;

obtain a common mode voltage of each bridge arm, the common mode voltage being configured to represent a demand of the motor for battery self-heating; and perform carrier modulation according to the differential mode voltage and the common mode voltage, to obtain a control signal of each bridge arm.

During specific implementation, the following two implementation orders may be included. The first implementation order is as follows: A control voltage of each bridge arm group for each winding of the motor is obtained according to the differential mode voltage and the common mode voltage. Then, a control signal of each bridge arm is obtained according to the control voltage in conjunction with a bus voltage and a carrier signal of the motor. The second implementation order is as follows: A differential mode duty ratio of each winding, controlled by each bridge arm group, of the motor is obtained according to the differential mode voltage and in conjunction with a bus voltage and a carrier signal of the motor. A common mode duty ratio of each winding, controlled by each bridge arm group, of the motor is obtained according to the common mode voltage and in conjunction with the bus voltage and the carrier signal of the motor. A control signal of each bridge arm is obtained according to the differential mode duty ratio and the common mode duty ratio. Since the principles of the foregoing two implementation orders are the same, to save space, the following descriptions only use the first implementation order as an example for explanation.

When a direction in which an N line current flows into the motor is positive, a difference obtained by subtracting the common mode voltage by the differential mode voltage is obtained, and each obtained difference is the control voltage of each bridge arm group for each winding of the motor.

The corresponding bridge arm is controlled according to the control signal of each bridge arm, to cause the crest and trough of the actual N line current flowing through the N line to counteract or be superposed with the crest and trough of the actual phase current flowing through each winding.

It should be noted that, the controller is specifically configured to: when a vehicle condition satisfies a first condition, control the corresponding bridge arm according to the control signal of each bridge arm, to cause the crest and trough of the actual N line current flowing through the N line to counteract the crest and trough of the actual phase current flowing through each winding; when the vehicle condition satisfies a second condition, control the corresponding bridge arm according to the control signal of each bridge arm, to cause the crest and trough of the actual N line current flowing through the N line to be superposed with the crest and trough of the actual phase current flowing through each winding.

Optionally, regarding the obtaining of the differential mode voltage of each bridge arm, the controller is further configured to:

obtain a target phase current composite vector, an actual phase current composite vector, and a rotor flux angle when a driving instruction is received, where the target phase current composite vector is a composite vector of target currents flowing through the windings of the motor, and the actual phase current composite vector is a composite vector of actual currents flowing through the windings of the motor; and obtain the differential mode voltage of each bridge arm according to the target phase current composite vector, the actual phase current composite vector, and the rotor flux angle.

Optionally, regarding the obtaining the above target phase current composite vector, the controller is further configured to:

obtain the target phase current composite vector according to a torque demand parameter, a speed value of the motor, a voltage parameter value of the power battery, and the rotor flux angle.

The torque demand parameter, the speed value of the motor, and the voltage parameter value (e.g. a total voltage of the first battery pack and the second battery pack) of the power battery may be obtained, and a d-axis target value id* and a q-axis target value iq* which satisfy the torque demand parameter are found through a maximum torque per ampere (MTPA) curve and a maximum torque per voltage (MTPV) curve. The target phase current composite vector includes the d-axis target value id* and the q-axis target value iq*. The target phase current composite vector can be obtained according to the d-axis target value id*, the q-axis target value iq*, and the rotor flux angle. The MTPA and MTPV curves may be calculated in advance and bench calibration is performed. Generally, the d-axis target value id* and the q-axis target value iq* are obtained by looking up a table or using a linear fitting method according to the torque demand parameter, the speed value of the motor, and the voltage parameter value of the power battery.

Optionally, regarding the obtaining of the differential mode voltage of each bridge arm according to the target phase current composite vector, the actual phase current composite vector, and the rotor flux angle, the controller is further configured to:

perform closed-loop control according to a d-axis target value id*, a d-axis actual value id, a q-axis target value iq*, and a q-axis actual value iq, to obtain a d-axis target voltage Ud and a q-axis target voltage Uq, where the target phase current composite vector includes the d-axis includes the d-axis actual value id and the q-axis actual value iq.

The obtaining of the d-axis actual value id and the q-axis actual value iq includes: An actual phase current flowing through each winding is sampled, and Clark coordinate transformation is performed on multiple sampled actual phase currents, to obtain current values iα and iβ in a two-phase static αβ coordinate system. Park coordinate transformation is performed on iα and iβ according to the rotor flux angle for conversion to a rotating dq coordinate system, to obtain the d-axis actual value id on the q-axis actual value iq.

After the d-axis target value id* and the d-axis actual value id are subtracted, the d-axis target voltage Ud is output through closed-loop control such as PID control. After the q-axis target value iq* and the q-axis actual value iq are subtracted, the q-axis target voltage Uq is output through closed-loop control such as PID control.

perform coordinate transformation according to the d-axis target voltage Ud, the q-axis target voltage Uq, and the rotor flux angle, to obtain the differential mode voltage of each bridge arm.

Inverse Park transformation is performed on the d-axis target voltage Ud and the q-axis target voltage Uq according to the rotor flux angle to obtain a target voltage Uα and a target voltage Uβ on the two-phase static αβ coordinate system, and inverse Clark transformation is performed on the target voltage Uα and the target voltage Uβ to obtain the differential mode voltage of each bridge arm.

Optionally, the controller is further configured to:

obtain a target N line current and an actual N line current when a self-heating instruction is received, the target N line current being a target current flowing through the N line.

A mode of obtaining the actual N line current may be: Current sampling is performed on the actual phase current flowing through each winding, to obtain multiple actual phase currents. According to a current principle, if a sum of the multiple actual phase currents and the actual N line current is equal to 0, the actual N line current can be obtained according to the multiple sampled actual phase currents.

perform closed-loop control according to the target N line current and the actual N line current, to obtain the common mode voltage of each bridge arm.

Optionally, regarding the obtaining of the target N line current, the controller is further configured to:

obtain an amplitude of the target N line current and phase information of the actual N line current; and obtain the target N line current according to the amplitude of the target N line current and the phase information of the actual N line current.

Optionally, regarding the obtaining of the amplitude of the target N line current, the controller is further configured to:

obtain a self-heating power demand parameter, a temperature parameter of the power battery, and a frequency of the actual phase current; and obtain the amplitude of the target N line current according to the self-heating power demand parameter, the temperature parameter, and the frequency.

A bench may be used to calibrate a correspondence relationship between the temperature parameter of the power battery (e.g. a battery core temperature), the amplitude of the target N line current, the frequency of the target N line current, and the self-heating power demand parameter (e.g. self-heating power). The correspondence relationship may be a table or a fitted curve. An actual phase current frequency f=speed*np/60 of the current alternating current motor is obtained according to a motor speed (unit: r/min) and a motor pole pair quantity np, and the frequency of the target N line current is obtained according to a change law of the frequency of the target N line current with the actual phase current frequency of the motor. The amplitude of the target N line current may be obtained according to the correspondence relationship, and the received self-heating power demand parameter, current temperature parameter of the power battery, and frequency of the target N line current.

Optionally, regarding the obtaining of the phase information of the actual N line current, the controller is further configured to:

obtain phase information of the actual phase current composite vector, the actual phase current composite vector being a composite vector of an actual current flowing through the windings of the motor; and obtain the phase information of the actual N line current according to the actual phase current composite vector and a quantity of phases of the motor.

Since the crest and trough of the actual N line current flowing through the N line need to be decreased from or increased by the crest and trough of the actual phase current flowing through each winding, the frequency of the actual N line current is a multiple of the frequency of the actual phase current, and the multiple is equal to a quantity of phases of the motor. Therefore, a phase of the actual N line current is equal to a product of the quantity of the phases of the motor and a phase of the actual phase current composite vector. Therefore, the phase information of the actual N line current may be obtained by using the following formula:

$$theta = p*\theta 1$$

In the formula, theta indicates the phase of the actual N line current; p indicates the quantity of the phases of the motor; and θ1 indicates the phase of the obtained actual phase current composite vector.

Optionally, regarding the obtaining of the phase information of the actual N line current, the controller is further configured to:

obtain actual phase currents of the windings of the motor, and perform Clark coordinate transformation on each of the obtained actual phase currents, to obtain an α-axis current and a β-axis current of the motor.

Figure 6:
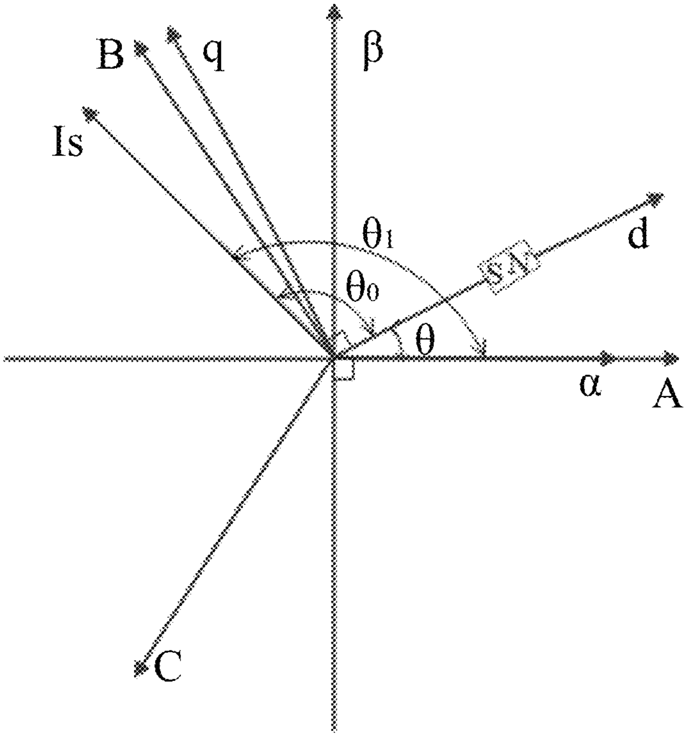
FIG. 6 is a schematic diagram of Clark coordinate transformation and Park coordinate transformation which are performed on a phase current of a three-phase alternating current motor according to an embodiment of the present disclosure.

As shown in FIG. 6, an example in which the motor is a three-phase alternating current motor is taken. Directions indicated by arrows A, B, and C in the figure respectively indicate directions of three phase currents of the three-phase alternating current motor. A, B, and C axes differ by a 120-degree electrical angle. An α-axis is coaxial with the A axis, and a β-axis is perpendicular to the α-axis, and ia, ab, and ic respectively indicate the three phase currents of the three-phase alternating current motor, that is, actual phase currents. Is indicates a composite vector of the phase currents ia, ib, and ic of the three-phase alternating current motor. θ1 indicates a phase of the obtained actual phase current composite vector Is. Iα indicates an α-axis current of the motor, and $I_\beta$ indicates a β-axis current of the motor. There are:

$$ia = Is * \cos(\theta 1)$$

$$ib = Is * \cos(\theta 1 - 120°)$$

$$ic = Is * \cos(\theta 1 + 120°)$$

$$I_\alpha = Is * \cos(\theta 1)$$

$$I_\beta = Is * \sin(\theta 1)$$

perform phase locked control on the α-axis current and the β-axis current, to obtain the phase information of the actual phase current composite vector.

Figure 7:
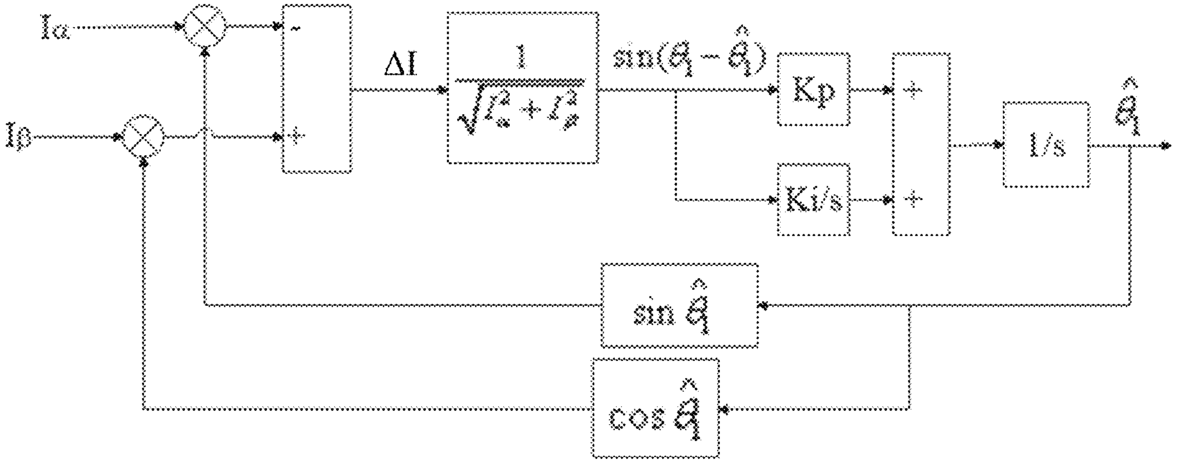
FIG. 7 is a schematic diagram of phase locking being performed on the a-axis current and the β-axis current according to an embodiment of the present disclosure.
Figure 8:
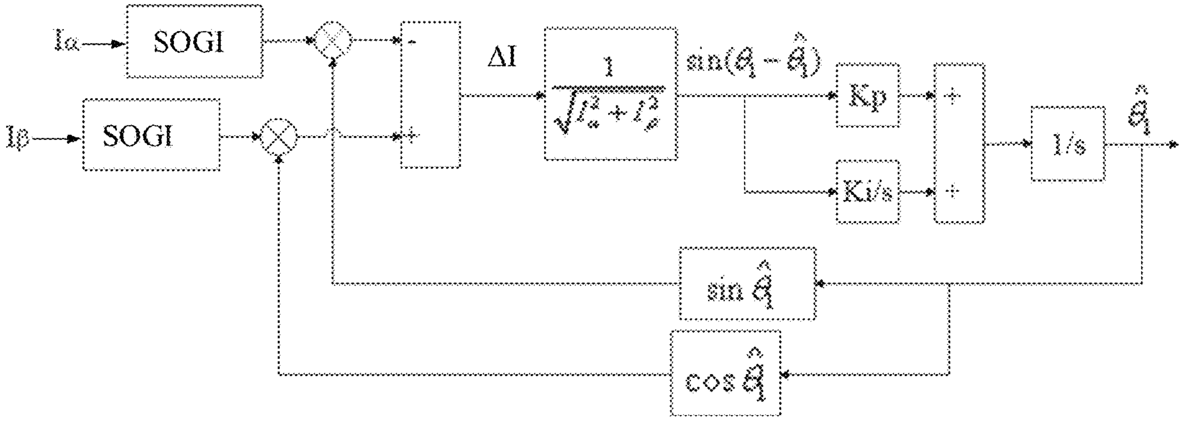
FIG. 8 is a schematic diagram of phase locking being performed on the a-axis current and the β-axis current according to another embodiment of the present disclosure.

Phase locking performed on the α-axis current and the β-axis current may be that a phase locked loop (PLL) is used to perform the phase locking on the α-axis current and the β-axis current, as shown in FIG. 7. Alternatively, the α-axis current and the β-axis current may flow through a second-order generalized integrator (SOGI) for filtering out of a direct current component, and then phase locking is performed using a phase locked loop. The second-order generalized integrator is configured to eliminate impact of an unbalanced current, a direct current component, and a higher harmonic in the phase currents of the alternating current motor on a phase locking result, as shown in FIG. 8.

The phase locked loop includes a sine and cosine difference calculation module, an amplitude normalization module, a proportional integral (PI) adjustment unit, and an integration unit. As shown in FIG. 7 and FIG. 8, after the α-axis current $I_\alpha$ and the β-axis current $I_\beta$ of the motor are obtained, or after $I_\alpha$ and $I_\beta$ flow through the SOGI, $I_\alpha$ and $I_\beta$ are input to the sine and cosine difference calculation module, or $I_\alpha$ and $I_\beta$ flowing through the SOGI are input to the sine and cosine difference calculation module, to obtain $\Delta I = I_\beta \cos(\hat{\theta}_1) - I_\alpha \sin(\hat{\theta}_1)$. The obtained ΔI is input to the amplitude normalization module, to obtain $\Delta\theta_1 = \Delta I/\mathrm{sqrt}(I_\alpha * I_\alpha, I_\beta * I_\beta)$. The obtained $\Delta\theta_1$ is input to the proportional integral (PI) adjustment unit, and a proportional integral operation is performed on $\Delta\theta_1$ to obtain a synchronous electric angular speed of the current. The synchronous electric angular speed is integrated through the integration unit to obtain $\hat{\theta}_1$, and an estimated angle $\hat{\theta}_1 \approx \theta_1$ is controlled through phase locked loop.

Optionally, regarding the obtaining of the phase information of the actual N line current, the controller is further configured to:

obtain a rotor flux angle of the motor on a d-axis of a synchronous rotation coordinate system.

In a vector control system oriented based on a rotor magnetic field, a direction of the rotor magnetic field keeps being consistent with a direction of the d-axis of the synchronous rotation coordinate system. Therefore, the rotor flux angle of the motor on the d-axis of the synchronous rotation coordinate system can be directly sampled.

obtain actual phase currents of the windings of the motor, perform Clark and Park coordinate transformation on each of the obtained actual phase current, to obtain a d-axis current on a q-axis current of the motor in the synchronous rotation coordinate system, and obtain phase information between the d-axis current and the q-axis current.

The d-axis current is denoted as id, and the q-axis current is denoted as iq. A phase between the d-axis current and the q-axis current is denoted as $\theta_0$. There is $\theta_0 = a\tan 2\,(iq/id)$.

obtain the phase information of the actual phase current composite vector according to the rotor flux angle and the phase information between the d-axis current and the q-axis current.

Referring to FIG. 5 again, as shown in FIG. 5, $\theta_1 = \theta + \theta_0$, where θ indicates the rotor flux angle. The phase $\theta_1$ of the actual phase current composite vector may be obtained by using the following formula:

$$\theta_1 = \theta + a\tan 2(iq/id)$$

During the obtaining of the phase $\theta_1$ of the actual phase current composite vector in consideration of fluctuation of an actual current, the actual id and the actual iq may be replaced with the d-axis target value id* and the q-axis target value iq* which are obtained according to the torque demand parameter. That is, θ1 is obtained by using the following formula:

$$\theta_1 = \theta + a\tan 2(iq*/id*)$$

Optionally, regarding the obtaining of the target N line current, when the vehicle condition satisfies the first condition, the controller is further configured to:

obtain the target N line current through the following formula according to the amplitude of the target N line current and the phase information of the actual N line current when a direction in which the current flows into the motor is positive:

$$In^* = ipk * \cos(\text{theta}); \text{ or}$$

$$In^* = ipk * \sin(\pi/2 - \text{theta});$$

where In* indicates the target N line current; ipk indicates the amplitude of the target N line current; and theta indicates the phase information of the actual N line current.

Optionally, regarding the obtaining of the target N line current, when the vehicle condition satisfies the second condition, the controller is further configured to:

obtain the target N line current through the following formula according to the amplitude of the target N line current and the phase information of the actual N line current when a direction in which the current flows into the motor is positive:

$$In^* = -ipk * \cos(\text{theta}); \text{ or}$$

$$In^* = -ipk * \sin(\pi/2 - \text{theta});$$

where In* indicates the target N line current; ipk indicates the amplitude of the target N line current; and theta indicates the phase information of the actual N line current.

Figure 9:
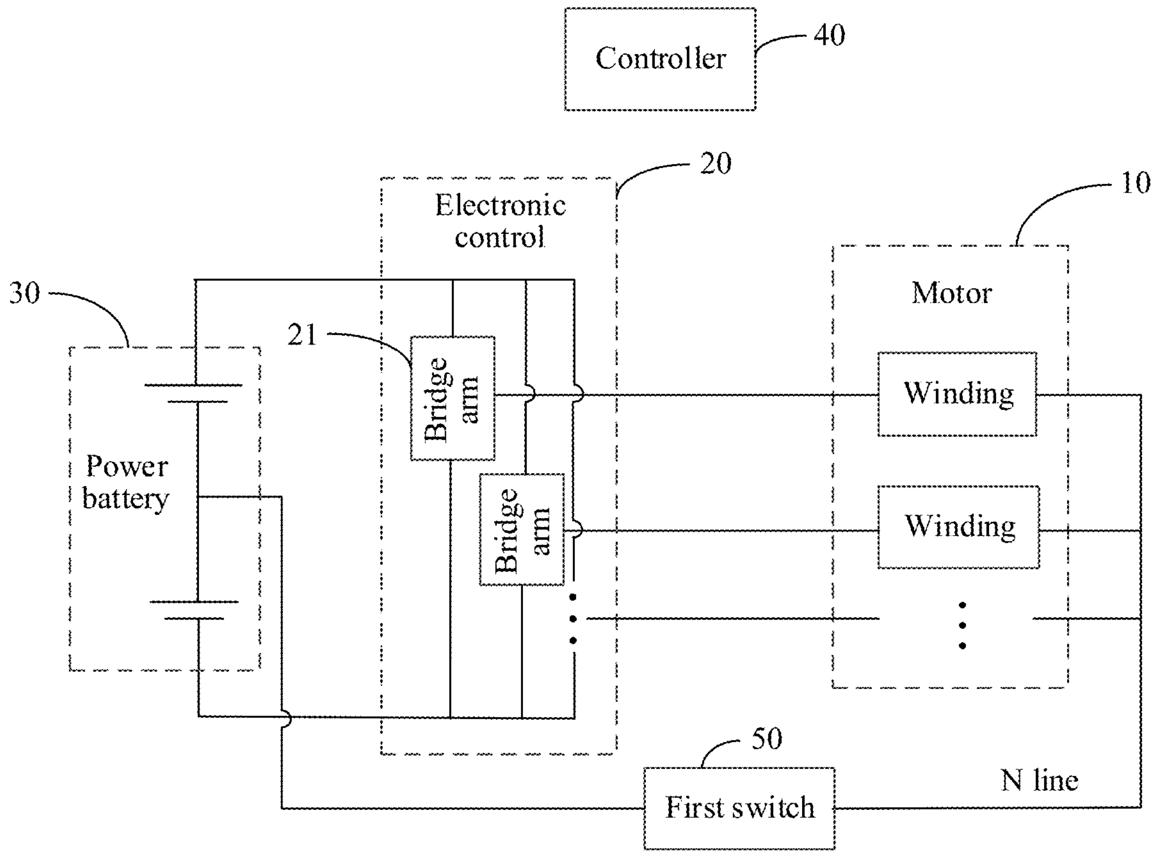
FIG. 9 is a block diagram of an energy conversion device according to another embodiment of the present disclosure.

Optionally, as shown in FIG. 9, the energy conversion device further includes:

a first switch, a first end of the first switch being connected to the N line, and a second end of the first switch being connected to the midpoint of the first battery pack and the midpoint of the second battery pack.

The controller is further configured to:

control, in a first state, the first switch to be opened, to drive the motor through the electronic control;

in a second state, control the first switch to be closed and control the electronic control, to cause the first battery pack and the second battery pack to be alternately charged and discharged, to achieve self-heating of the power battery; and in a third state, control the first switch to be closed and control the electronic control, to cause the actual phase current of each winding to correspond to a d-axis and a q-axis to drive the motor, and to cause the actual N line current flowing through the N-line to correspond to an O-axis, to achieve self-heating of the power battery, where the O-axis is perpendicular to the d-axis and the q-axis.

Figure 10:
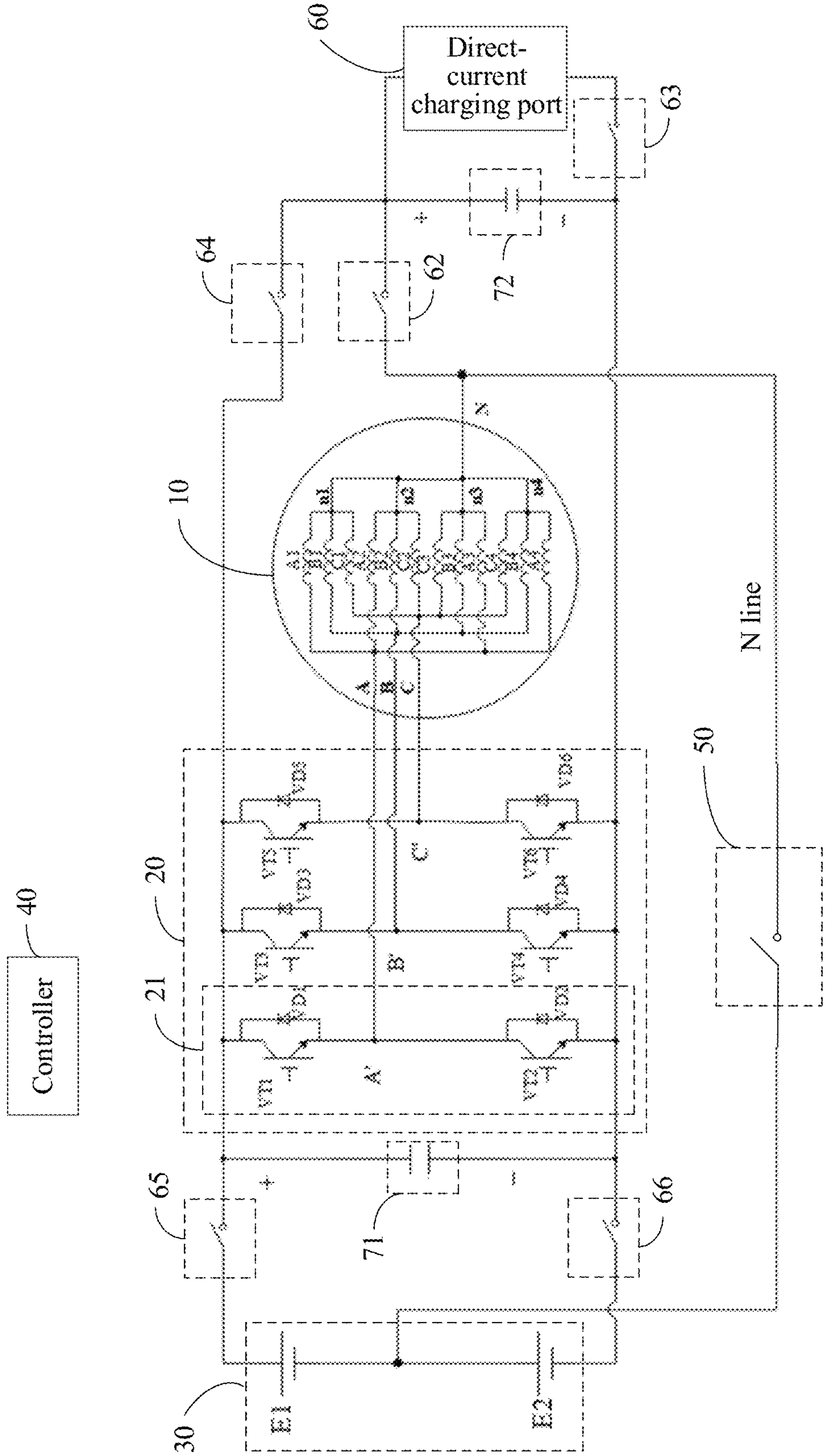
FIG. 10 is a circuit diagram of an energy conversion device according to an embodiment of the present disclosure.

Optionally, as shown in FIG. 10, the energy conversion device further includes:

a direct-current charging port 60, a positive terminal of the direct-current charging port 60 being connected to the N line, and a negative terminal of the direct-current charging port 60 being connected to the second bus terminal.

The controller 40 is further configured to: control the electronic control 20 when a charging instruction is received, to reuse the windings of the motor 10 and the bridge arms of the electronic control 20, to form a boost module to perform direct-current boost charging on the power battery 30.

Optionally, the energy conversion device further includes:

a direct-current charging port 60, a positive terminal of the direct-current charging port 60 being connected to the first bus terminal, and a negative terminal of the direct-current charging port 60 being connected to the second bus terminal.

The controller 40 is further configured to: perform direct-current direct charging on the power battery 30 through the direct-current charging port 60 when a charging instruction is received.

Optionally, to control the direct-current charging port 60 to perform or not perform direct-current boost charging on the power battery 30, and to control the direct-current charging port 60 to perform or not perform direct-current direct charging on the power battery 30, the energy conversion device further includes: a second switch 62, a third switch 63, a fourth switch 64, a fifth switch 65, and a sixth switch 66. The second switch 62 is connected between the positive terminal of the direct-current charging port 60 and the N line. The third switch 63 is connected between the negative terminal of the direct-current charging port 60 and the second bus terminal. The fourth switch 64 is connected between the first bus terminal and the positive terminal of the direct-current charging port 60.

When the direct-current boost charging is required, the second switch 62, the third switch 63, the fifth switch 65, and the sixth switch 66 are closed, and the first switch 50 and the fourth switch 64 are opened.

When the direct-current direct charging and self-heating need to cooperate with each other, the third switch 63, the fourth switch 64, the fifth switch 65, and the sixth switch 66 are closed, the second switch 62 is opened, and the first switch 50 is closed.

When the direct-current direct charging is required, but self-heating is not carried out, the third switch 63, the fourth switch 64, the fifth switch 65, and the sixth switch 66 are closed, and the second switch 62 and the first switch 50 are opened.

When only self-heating is carried out, the first switch 50, the fifth switch 65, and the sixth switch 66 are closed, and the second switch 62, the third switch 63, and the fourth switch 64 are opened.

It should be noted that, the fifth switch 65 and the sixth switch 66 may alternatively be normally closed, that is, the fifth switch 65 and the sixth switch 66 are two wires.

Optionally, the energy conversion device further includes: a first capacitor 71 and a second capacitor 72. One end of the first capacitor 71 is connected to a serial connection point between the fifth switch 65 and the first bus terminal, and the other end is connected to a serial connection point between the sixth switch 66 and the second bus terminal. One end of the second capacitor 72 is connected to a serial connection point of the second switch 62, the fourth switch 64, and the direct-current charging port 60, and the other end is connected between the third switch 63 and the sixth switch 66.

Optionally, the motor is a three-phase motor. The motor includes three winding. Each winding includes: $n_x$ coil branches. The $n_x$ coil branches of each winding are connected together to form a phase endpoint. One of the $n_x$ coil branches of each winding is further respectively connected to one of the $n_x$ coil branches of each of other windings to form $n_x$ connection points. The $n_x$ connection points form T neutral points. An N line is led out of the T neutral points, where, $n_x$ is greater than or equal to 1, and $n_x \geq T \geq 1$, $n_x$, and T are integers.

The electronic control includes three bridge arms. A midpoint of each bridge arm is connected to the phase endpoint of the corresponding winding.

For example, as shown in FIG. 10, in FIG. 10, $n_x$ is equal to 4, and T is equal to 4. Namely, the motor 10 is a three-phase motor. The motor 10 includes three windings. Each winding includes four coil branches. The four coil branches of each winding are connected together to form one phase endpoint, thus totally forming three phase endpoints A, B, and C. One of the 4 coil branches of each winding is further respectively connected to one of the 4 coil branches of each of other windings to totally form 4 connection points n1, n2, n3, and n4. The 4 connection points form four neutral points. One N line is led out of the four neutral points. The electronic control 20 includes three bridge arms 21. A midpoint A', B', or C' of each bridge arm 21 is connected to the phase endpoint A, B, or C of the corresponding winding.

Based on the above technical concept, an embodiment of the present disclosure further provides a vehicle. The vehicle includes the above battery self-heating system.

The preferred implementations of the present disclosure are described in detail above with reference to the accompanying drawings. However, the present disclosure is not limited to the specific details in the foregoing implementations, various simple transformations may be made to the technical solutions of the present disclosure within a range of the technical concept of the present disclosure, and these simple transformations fall within the protection scope of the present disclosure.

It should be additionally noted that, the respective specific technical features described in the foregoing specific implementations may be combined in any proper manner without conflicts. To avoid unnecessary repetitions, the present disclosure will not additionally describe various possible combination manners.

In addition, different implementations of the present disclosure may alternatively be arbitrarily combined without departing from the idea of the present disclosure, and these combinations shall still be regarded as content disclosed in the present disclosure.

What is claimed is:

1. An energy conversion device, applied to a vehicle and comprising:

a motor, the motor comprising at least two windings, and first ends of the at least two windings being connected together and leading out an N line;

an electronic control, the electronic control comprising at least two bridge arms, first ends of the at least two bridge arms being connected together to form a first bus terminal, second ends of the at least two bridge arms being connected together to form a second bus terminal, and a midpoint of each bridge arm being connected to a second end of the corresponding winding;

a power battery, the power battery comprising a first battery pack and a second battery pack connected in series to the first battery pack, a positive terminal of the first battery pack being connected to the first bus terminal, a negative terminal of the second battery pack being connected to the second bus terminal, and a midpoint of the first battery pack and a midpoint of the second battery pack being connected to the N line; and a controller, the controller being connected to the electronic control, and the controller being configured to:

when a vehicle condition satisfies a first condition, control each of the bridge arms corresponding to the windings of the motor, to achieve cooperation between driving and battery self-heating, and control each of the bridge arms corresponding to the windings of the motor, to cause a crest and trough of an actual N line current flowing through the N line to counteract a crest and trough of an actual phase current flowing through each winding; and when the vehicle condition satisfies a second condition, control each of the bridge arms corresponding to the windings of the motor, to achieve cooperation between driving and battery self-heating, and control each of the bridge arms corresponding to the windings of the motor, to cause a crest and trough of an actual N line current flowing through the N line to be superposed with a crest and trough of an actual phase current flowing through each winding, wherein the first condition and the second condition are different.

2. The energy conversion device according to claim 1, wherein the first condition comprises: an obtained depth of an accelerator pedal is greater than a preset depth, or an obtained remaining battery level of the power battery is less than a preset battery level.

3. The energy conversion device according to claim 1, wherein the second condition comprises: a received temperature corresponding to a passenger compartment warmup demand is greater than a current passenger compartment temperature, or an obtained temperature corresponding to a warmup demand of the power battery is greater than a current temperature of the power battery.

4. The energy conversion device according to claim 1, wherein the controller is further configured to:

obtain a differential mode voltage of each bridge arm, the differential mode voltage being configured to represent a demand for an output torque of the motor;

obtain a common mode voltage of each bridge arm, the common mode voltage being configured to represent a demand of the motor for battery self-heating;

perform carrier modulation according to the differential mode voltage and the common mode voltage, to obtain a control signal of each bridge arm; and control the corresponding bridge arm according to the control signal of each bridge arm, to cause the crest and trough of the actual N line current flowing through the N line to counteract or be superposed with the crest and trough of the actual phase current flowing through each winding.

5. The energy conversion device according to claim 4, wherein the controller is further configured to:

obtain a target phase current composite vector, an actual phase current composite vector, and a rotor flux angle when a driving instruction is received, wherein the target phase current composite vector is a composite vector of target currents flowing through the windings of the motor, and the actual phase current composite vector is a composite vector of actual currents flowing through the windings of the motor; and obtain the differential mode voltage of each bridge arm according to the target phase current composite vector, the actual phase current composite vector, and the rotor flux angle.

6. The energy conversion device according to claim 5, wherein the controller is further configured to:

obtain the target phase current composite vector according to a torque demand parameter, a speed value of the motor, a voltage parameter value of the power battery, and the rotor flux angle.

7. The energy conversion device according to claim 5, wherein the controller is further configured to:

perform closed-loop control according to a d-axis target value id*, a d-axis actual value id, a q-axis target value iq*, and a q-axis actual value iq, to obtain a d-axis target voltage Ud and a q-axis axis target voltage Uq, where the target phase current composite vector comprises the d-axis target value id* and the q-axis target value iq*, and the actual phase current composite vector comprises the d-axis actual value id and the q-axis actual value iq; and perform coordinate transformation according to the d-axis target voltage Ud, the q-axis target voltage Uq, and the rotor flux angle, to obtain the differential mode voltage of each bridge arm.

8. The energy conversion device according to claim 1, wherein the controller is further configured to:

obtain a target N line current and an actual N line current when a self-heating instruction is received, the target N line current being a target current flowing through the N line; and perform closed-loop control according to the target N line current and the actual N line current, to obtain the common mode voltage of each bridge arm.

9. The energy conversion device according to claim 8, wherein the controller is further configured to:

obtain an amplitude of the target N line current and phase information of the actual N line current; and obtain the target N line current according to the amplitude of the target N line current and the phase information of the actual N line current.

10. The energy conversion device according to claim 9, wherein the controller is further configured to:

obtain a self-heating power demand parameter, a temperature parameter of the power battery, and a frequency of the actual phase current; and obtain the amplitude of the target N line current according to the self-heating power demand parameter, the temperature parameter, and the frequency.

11. The energy conversion device according to claim 9, wherein the controller is further configured to:

obtain phase information of the actual phase current composite vector, the actual phase current composite vector being a composite vector of an actual current flowing through the windings of the motor; and obtain the phase information of the actual N line current according to the actual phase current composite vector and a quantity of phases of the motor.

12. The energy conversion device according to claim 11, wherein the controller is further configured to:

obtain actual phase currents of the windings of the motor, and perform Clark coordinate transformation on each of the obtained actual phase currents, to obtain an α-axis current and a β-axis current of the motor; and perform phase locked control on the α-axis current and the β-axis current, to obtain the phase information of the actual phase current composite vector.

13. The energy conversion device according to claim 11, wherein the controller is further configured to:

obtain a rotor flux angle of the motor on a d-axis of a synchronous rotation coordinate system;

obtain actual phase currents of the windings of the motor, perform Clark and Park coordinate transformation on each of the obtained actual phase current, to obtain a d-axis current on a q-axis current of the motor in the synchronous rotation coordinate system, and obtain phase information between the d-axis current and the q-axis current; and obtain the phase information of the actual phase current composite vector according to the rotor flux angle and the phase information between the d-axis current and the q-axis current.

14. The energy conversion device according to claim 9, wherein when the vehicle condition satisfies the first condition, the controller is further configured to:

obtain the target N line current through the following formula according to the amplitude of the target N line current and the phase information of the actual N line current when a direction in which the current flows into the motor is positive:

$$In^* = ipk * \cos(\text{theta}); \text{ or}$$

$$In^* = ipk * \sin(\pi/2 - \text{theta});$$

wherein In* indicates the target N line current; ipk indicates the amplitude of the target N line current; and theta indicates the phase information of the actual N line current.

15. The energy conversion device according to claim 9, wherein when the vehicle condition satisfies the second condition, the controller is further configured to:

obtain the target N line current through the following formula according to the amplitude of the target N line current and the phase information of the actual N line current when a direction in which the current flows into the motor is positive:

$$In^* = -ipk * \cos(\text{theta}); \text{ or}$$

$$In^* = -ipk * \sin(\pi/2 - \text{theta});$$

wherein In* indicates the target N line current; ipk indicates the amplitude of the target N line current; and theta indicates the phase information of the actual N line current.

16. The energy conversion device according to claim 1, further comprising:

a first switch, a first end of the first switch being connected to the N line, and a second end of the first switch being connected to the midpoint of the first battery pack and the midpoint of the second battery pack; and the controller is further configured to:

control, in a first state, the first switch to be opened, to drive the motor through the electronic control;

in a second state, control the first switch to be closed and control the electronic control, to cause the first battery pack and the second battery pack to be alternately charged and discharged, to achieve self-heating of the power battery; and in a third state, control the first switch to be closed and control the electronic control, to cause the actual phase current of each winding to correspond to a d-axis and a q-axis to drive the motor, and to cause the actual N line current flowing through the N-line to correspond to an O-axis, to achieve self-heating of the power battery, wherein the O-axis is perpendicular to the d-axis and the q-axis.

17. The energy conversion device according to claim 1, further comprising:

a direct-current charging port, a positive terminal of the direct-current charging port being connected to the N line, and a negative terminal of the direct-current charging port being connected to the second bus terminal; and the controller is further configured to: control the electronic control when a charging instruction is received, to reuse the windings of the motor and the bridge arms of the electronic control, to form a boost module to perform direct-current boost charging on the power battery.

18. The energy conversion device according to claim 1, further comprising:

a direct-current charging port, a positive terminal of the direct-current charging port being connected to the first bus terminal, and a negative terminal of the direct-current charging port being connected to the second bus terminal; and the controller is further configured to: perform direct-current direct charging on the power battery through the direct-current charging port when a charging instruction is received.

19. The energy conversion device according to claim 1, wherein the motor is a three-phase motor; the motor comprises three windings; and each winding comprises $n_x$ coil branches; the $n_x$ coil branches of each winding are connected together to form a phase endpoint; one of the $n_x$ coil branches of each winding is further respectively connected to one of the $n_x$ coil branches of each of other windings to form $n_x$ connection points; the $n_x$ connection points form T neutral points; an N line is led out of the T neutral points, wherein $n_x$ is greater than or equal to 1, and $n_x \geq T \geq 1$, $n_x$, and T are integers;

the electronic control comprises three bridge arms; a midpoint of each bridge arm is connected to the phase endpoint of the corresponding winding.

20. A vehicle, comprising: the energy conversion device according to claim 1.

* * * * *